(12) United States Patent
Fukuta

(10) Patent No.: US 9,075,700 B2
(45) Date of Patent: Jul. 7, 2015

(54) DATA OUTPUT DEVICE FOR VEHICLE

(71) Applicant: DENSO CORPORATION, Kariya, Aichi-pref. (JP)

(72) Inventor: Kenji Fukuta, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 13/851,516

(22) Filed: Mar. 27, 2013

(65) Prior Publication Data

US 2013/0261878 A1 Oct. 3, 2013

(30) Foreign Application Priority Data

Mar. 28, 2012 (JP) .................................. 2012-74379

(51) Int. Cl.
*G06F 17/00* (2006.01)
*G05B 19/042* (2006.01)

(52) U.S. Cl.
CPC ............ *G06F 17/00* (2013.01); *G05B 19/0428* (2013.01)

(58) Field of Classification Search
CPC ......... G06F 17/00; G06F 17/30; G06F 17/40; G05B 19/0428; G05B 19/0423; G05B 19/048
USPC ........... 701/29.1, 29.4, 29.7, 29.9, 30.4, 30.5, 701/30.8, 30.9, 31.1–31.6, 31.8, 31.9, 32.1, 701/32.7, 33.2–33.4, 33.6–33.9, 34.4
See application file for complete search history.

(56) References Cited

U.S. PATENT DOCUMENTS

| | | | | |
|---|---|---|---|---|
| 5,005,129 | A * | 4/1991 | Abe et al. ...................... | 701/31.4 |
| 5,737,711 | A * | 4/1998 | Abe ............................. | 701/33.4 |
| 6,330,499 | B1 * | 12/2001 | Chou et al. ................... | 701/31.4 |
| 8,589,018 | B2 * | 11/2013 | Sarnacke et al. ............. | 701/29.2 |
| 8,798,843 | B2 * | 8/2014 | Sakai et al. .................. | 701/29.1 |
| 2002/0193925 | A1 * | 12/2002 | Funkhouser et al. .......... | 701/33 |
| 2003/0060953 | A1 * | 3/2003 | Chen ............................ | 701/33 |
| 2006/0041347 | A1 * | 2/2006 | Chinnadurai et al. .......... | 701/35 |
| 2006/0247831 | A1 | 11/2006 | Shimokoshi | |
| 2006/0293811 | A1 * | 12/2006 | Andreasen et al. ............ | 701/29 |
| 2007/0083304 | A1 * | 4/2007 | Yamada ........................ | 701/29 |

(Continued)

FOREIGN PATENT DOCUMENTS

JP 2003-087174 3/2003
JP 2003087174 A * 3/2003

(Continued)

OTHER PUBLICATIONS

Office Action (2 pages) dated Mar. 4, 2014, issued in corresponding Japanese Application No. 2012-074379 and English translation (2 pages).

*Primary Examiner* — Thomas G Black
*Assistant Examiner* — Sara Nelson
(74) *Attorney, Agent, or Firm* — Nixon & Vanderhye PC

(57) ABSTRACT

A data output device for a vehicle that performs data communication with an external diagnosis tool and performs data communication with an in-vehicle control unit, which outputs specific diagnosis data in response to a request from the diagnosis tool, includes: a cache memory section for storing the specific diagnosis data; a cache save section for controlling the cache memory section to store the specific diagnosis data output from the control unit; and a cache read section for reading the specific diagnosis data in the cache memory section and responding to the diagnosis tool based on the specific diagnosis data when the request from the diagnosis tool requests the specific diagnosis data.

11 Claims, 7 Drawing Sheets

(56) References Cited

U.S. PATENT DOCUMENTS

| | | |
|---|---|---|
| 2008/0021607 A1 | 1/2008 | Kato et al. |
| 2008/0033609 A1* | 2/2008 | Razavi .................... 701/33 |
| 2008/0103656 A1* | 5/2008 | Lipscomb et al. ........... 701/35 |
| 2008/0119981 A1* | 5/2008 | Chen ....................... 701/33 |
| 2009/0105903 A1 | 4/2009 | Iwai |
| 2009/0240392 A1* | 9/2009 | Yamashita et al. ........... 701/33 |
| 2010/0324777 A1* | 12/2010 | Tominaga et al. ........... 701/33 |
| 2011/0238262 A1 | 9/2011 | Fukuta |

FOREIGN PATENT DOCUMENTS

| | | | |
|---|---|---|---|
| JP | 2005053309 A | * | 3/2005 |
| JP | 2006-023850 | | 1/2006 |
| JP | 2006023850 A | * | 1/2006 |
| JP | 2006-113668 | | 4/2006 |
| JP | 2008024015 A | * | 2/2008 |
| JP | 2009-152922 | | 7/2009 |
| JP | 2009152922 A | * | 7/2009 |

* cited by examiner

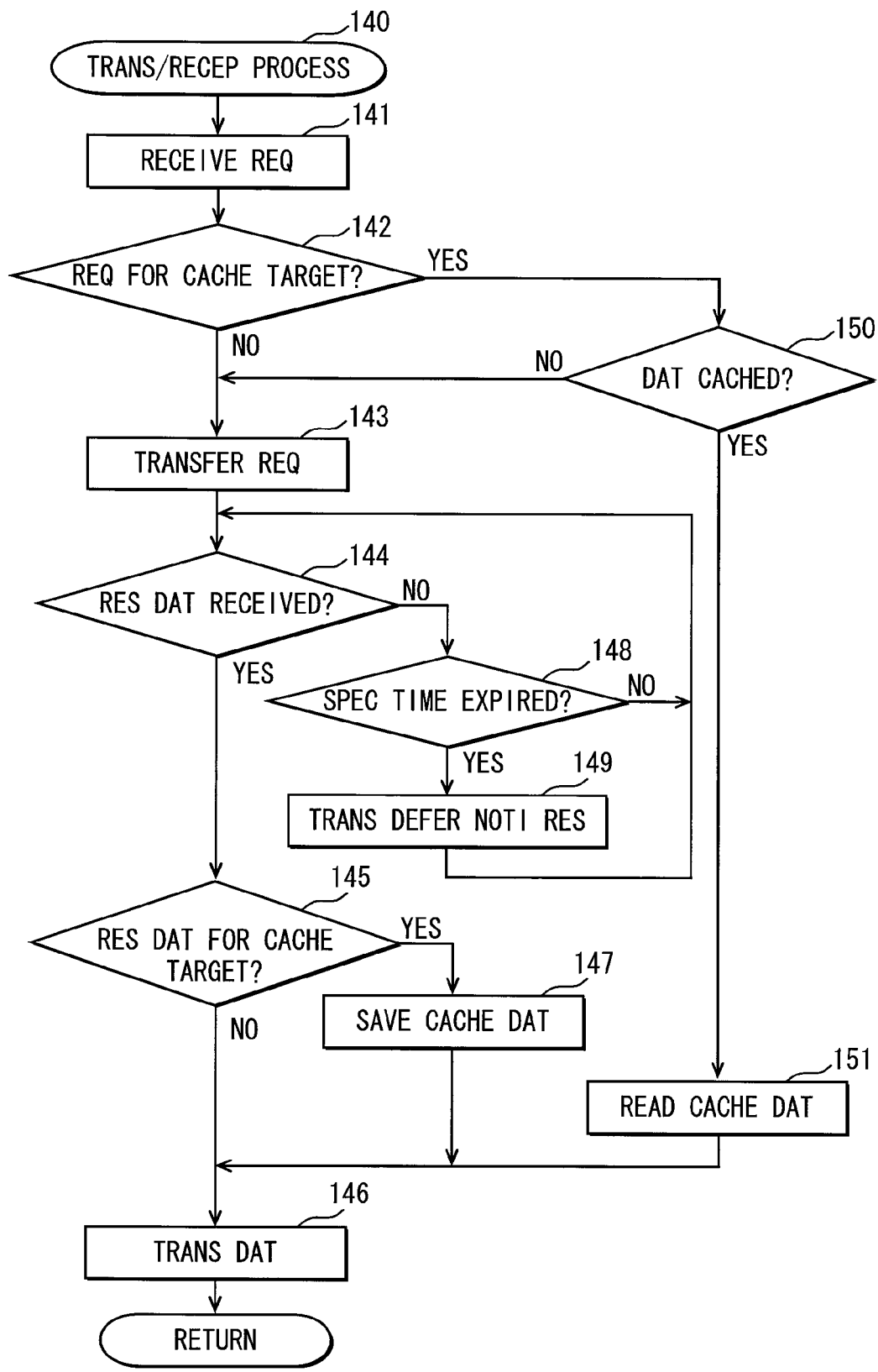

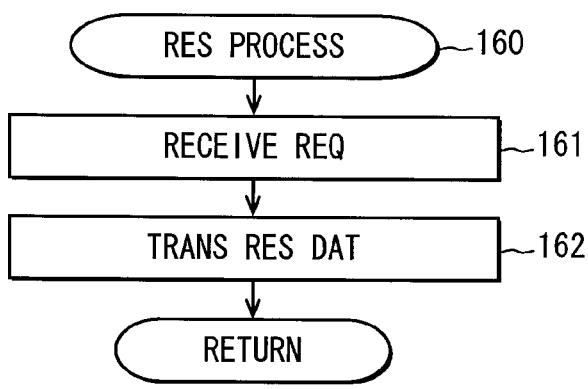
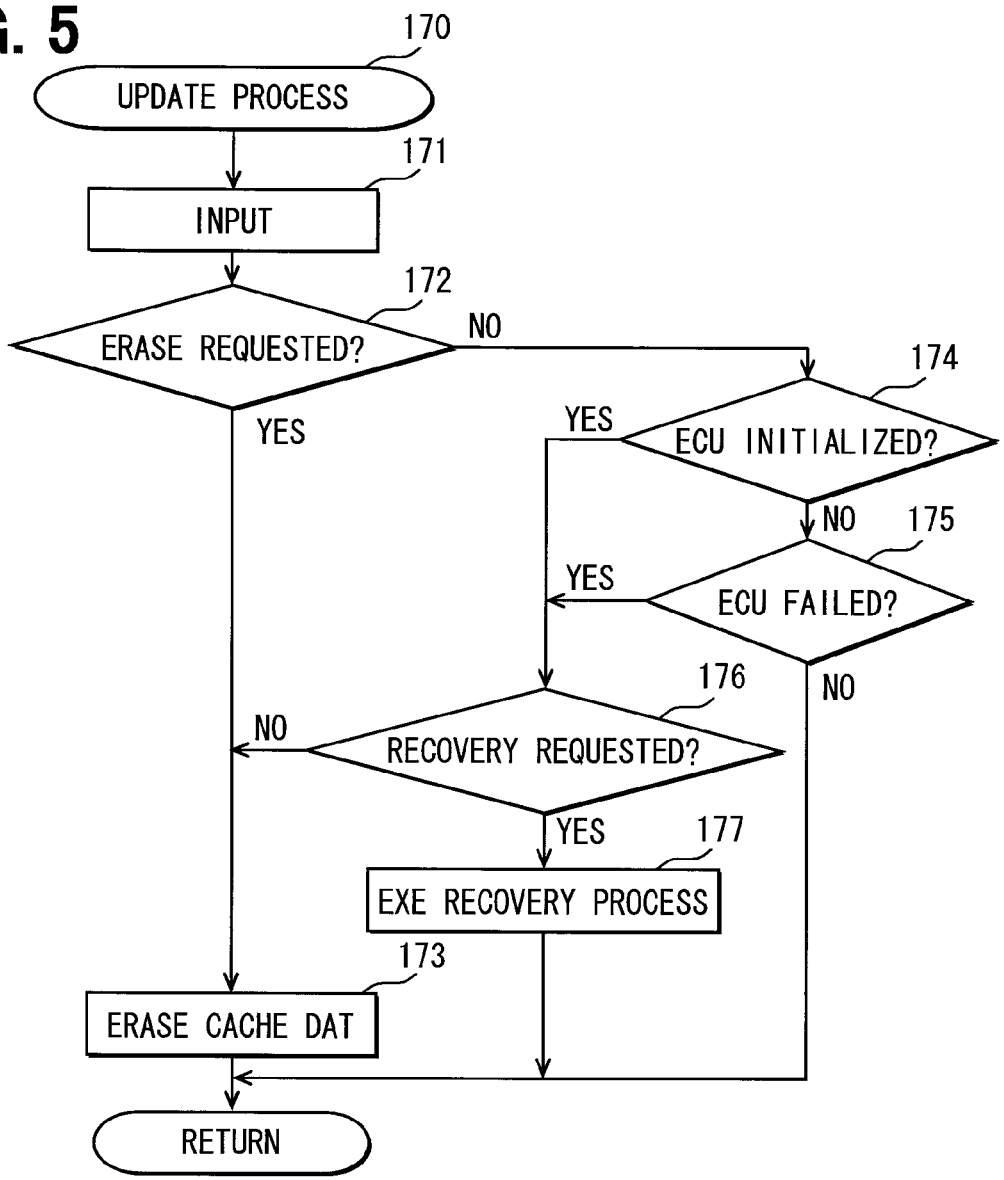

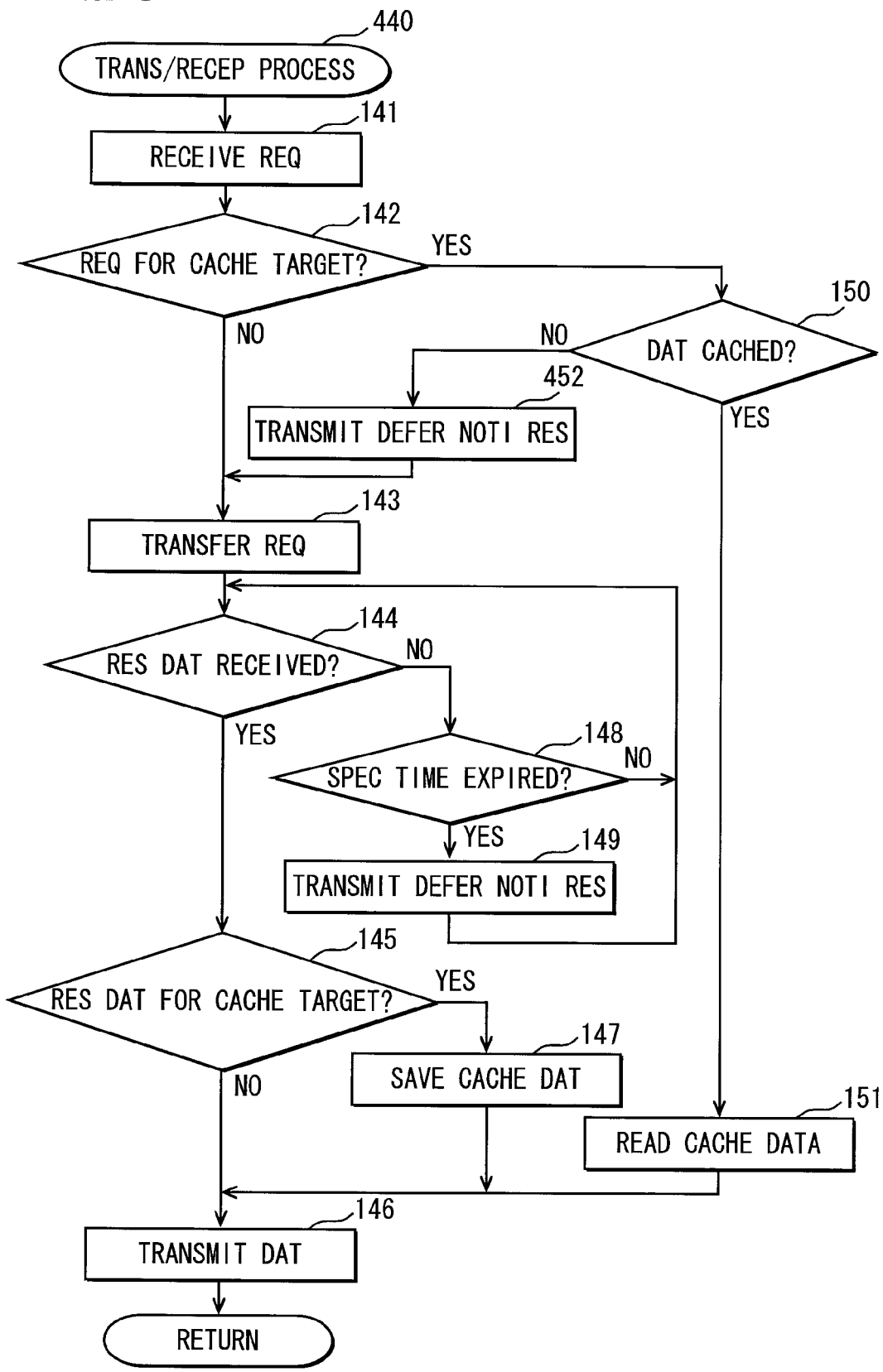

DATA OUTPUT DEVICE FOR VEHICLE

CROSS REFERENCE TO RELATED APPLICATION

This application is based on Japanese Patent Application No. 2012-74379 filed on Mar. 28, 2012, the disclosure of which is incorporated herein by reference.

TECHNICAL FIELD

The present disclosure relates to a data output device for a vehicle, which is suitably used in an in-vehicle system including a plurality of electronic control units.

BACKGROUND

Each of Patent Documents 1 and 2 discloses an in-vehicle system in which a plurality of electronic control units (hereinafter abbreviated as ECUs) are connected by a communication line to be capable of communicating data therebetween. The in-vehicle system is configured to be able to communicate data related to the diagnosis of the plurality of ECUs. The in-vehicle system is also configured to be able to transmit data to an external device provided outside a vehicle. For example, a configuration is known which outputs data related to diagnosis to an external device so as to support the diagnosis of a failure in a vehicle in a repair plant or the like.

An in-vehicle system includes a plurality of ECUs. However, each of the ECUs needs to provide its intrinsic control function of controlling equipment mounted in a vehicle. As a result, the ECU may take a long time to transmit data related to diagnosis to an external device.

On the other hand, the communication line of the in-vehicle system also needs to provide its intrinsic function of communicating data for controlling the vehicle. As a result, the communication line may take a long time to transmit/receive data related to diagnosis. In addition, from another viewpoint, it is undesirable that traffic on the communication line increases to transmit/receive data related to diagnosis.

From another perspective, the in-vehicle system and the external device should comply with a common communication standard to allow data communication therebetween. However, for the in-vehicle system and the external device, different communication standards may be selected and used by their manufacturers. For example, when the external device is provided by a general-purpose microcomputer, it is desirable that a general-purpose communication standard can be used. Therefore, the in-vehicle system is required to be compatible with a plurality of communication standards.

[Patent Document 1] JP-A-2003-87174
[Patent Document 2] JP-A-2011-203082 (corresponding to US 2011/0238262)

SUMMARY

It is an object of the present disclosure to provide a data output device for a vehicle, which allows high-speed transmission of data related to diagnosis. Further, the data output device allows high-speed transmission of data related to diagnosis by means of a control unit having a gateway function of allowing communication between different communication standards.

According to an example aspect of the present disclosure, a data output device for a vehicle that performs data communication with a diagnosis tool disposed on an outside of the vehicle and performs data communication with an in-vehicle control unit, which outputs specific diagnosis data in response to a request from the diagnosis tool, includes: a cache memory section for storing the specific diagnosis data; a cache save section for controlling the cache memory section to store the specific diagnosis data output from the control unit; and a cache read section for reading the specific diagnosis data in the cache memory section and responding to the diagnosis tool based on the specific diagnosis data when the request from the diagnosis tool requests the specific diagnosis data.

In this configuration, the cache save section saves the specific diagnosis data in the memory section. After the saving process by the cache save section, a request for the specific diagnosis data may be transmitted from the diagnosis tool. In this case, the cache read section reads the specific diagnosis data saved in the cache memory section and responds to the diagnosis tool based on the saved specific diagnosis data. Accordingly, when viewed from the diagnosis tool, the specific diagnosis data is supplied from a data output section for a vehicle closer to the diagnosis tool than the control unit. As a result, high-speed transmission of data related to diagnosis is achieved.

BRIEF DESCRIPTION OF THE DRAWINGS

The above and other objects, features and advantages of the present disclosure will become more apparent from the following detailed description made with reference to the accompanying drawings. In the drawings:

FIG. 3 is a flow chart showing a transmission/reception process in the first embodiment;

FIG. 4 is a flow chart showing a response process in the first embodiment;

FIG. 5 is a flow chart showing an update process in the first embodiment;

FIG. 9 is a flow chart showing a transmission/reception process in a fourth embodiment.

DETAILED DESCRIPTION

Figure 1:
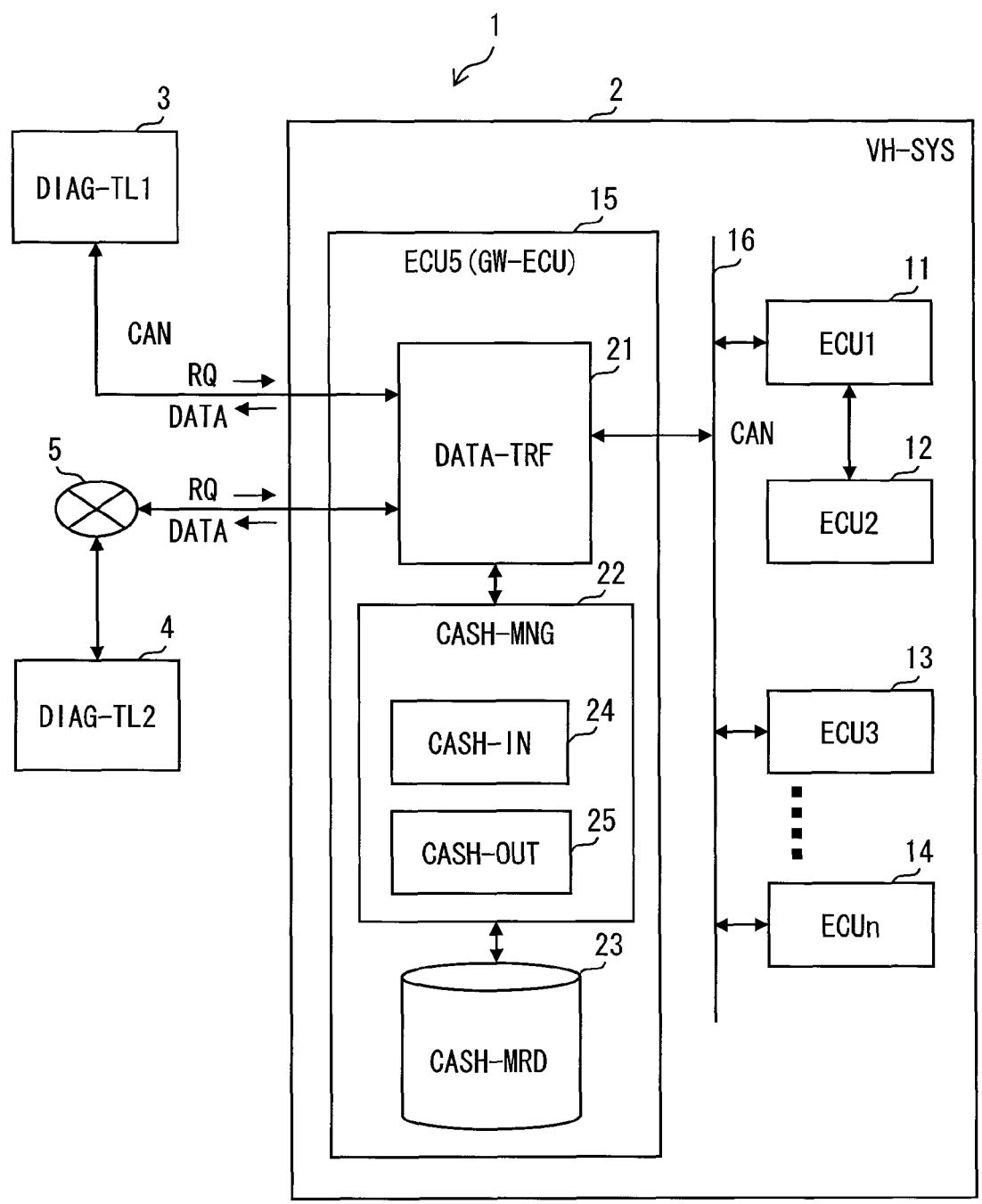
FIG. 1 is a block diagram showing a system in a first embodiment.

Referring now to the drawings, a description will be given below to a plurality of embodiments for carrying out the preset disclosure. In each of the embodiments, parts corresponding to the items described in the previous embodiment may be designated by the same reference numerals to omit the repeated description thereof. When only a part of a configuration is described in each of the embodiments, another embodiment previously described can be applied to the other part of the configuration. Also, in the subsequent embodiment, parts corresponding to the items described in the previous embodiment may be designated by reference numerals of which only hundreds or more digits are different to show correspondence relations and omit the repeated description thereof. Not only it is possible to combine parts which are clearly shown to be able to be specifically combined in each of the embodiments, but also it is possible to partially combine the individual embodiments even though they are not clearly shown to be able to be combined, as long as the combination shows no particular trouble.

First Embodiment

In FIG. 1, a maintenance support system for vehicle 1 includes an in-vehicle control system (VH-SYS) 2 mounted in a vehicle, and diagnosis tools (DIAG-TL1 and DIAG-TL2) 3 and 4. The diagnosis tools 3 and 4 are placed in a vehicle dealer shop or a vehicle repair plant. The diagnosis tools 3 and 4 acquire data related to diagnosis (hereinafter referred to as diagnosis data) from the in-vehicle control system 2. The diagnosis tools 3 and 4 support a vehicle maintenance operation based on the diagnosis data. For example, the diagnosis tools 3 and 4 support the maintenance operation by displaying the diagnosis data to an operator. The diagnosis tools 3 and 4 may also automatically diagnose the soundness of the in-vehicle control system 2 based on the diagnosis data using, e.g., a preset condition determining function. In this case, the diagnosis tools display the result of the diagnosis to the operator. The diagnosis tools 3 and 4 can include the first diagnosis tool 3 and the second diagnosis tool 4.

The maintenance operation can include diagnosis for determining whether or not the in-vehicle control system 2 is sound. The maintenance operation can also include diagnosis for searching the failed portion of the in-vehicle control system 2. The maintenance operation can also include an operation of repairing the failed portion of the in-vehicle control system 2.

The diagnosis data can include various data items which can contribute to the vehicle maintenance operation. For example, the diagnosis data can include real-time data showing the current operating states of control units. The diagnosis data can include recorded data showing the operating state of the in-vehicle control system 2 when a specified event occurred. The recorded data is data showing the past operating state, which has a relatively large capacity and is recorded without being changed. As an exemplary event for which the recorded data is recorded, any abnormality, a specified driving state, or a specified driving operation can be used. The diagnosis data can also include data showing the result of self-diagnosis obtained in the in-vehicle control system 2.

The first diagnosis tool 3 is connected by wired or wireless connection to the in-vehicle control system 2. Between the first diagnosis tool 3 and the in-vehicle control system 2, a wired connection device including a cable and a connector or a transmission/reception system for wireless communication can be provided. The first diagnosis tool 3 provides data communication by wired connection in accordance with a specified communication protocol. The first diagnosis tool 3 can comply with, e.g., CAN (Controller Area Network) or UN (Local Interconnect Network) used as a vehicle LAN (Local Area Network). Therefore, the first diagnosis tool 3 can be called a dedicated tool having a dedicated interface compliant with a specified vehicle communication standard.

The second diagnosis tool 4 is connected by wired or wireless connection via an external communication line 5 to the in-vehicle control system 2. Between the communication line 5 and the in-vehicle control system 2, a wired connection device including a cable and a connector or a transmission/reception system for wireless communication can be provided. The communication line 5 can be provided by a mobile phone line or the Internet. The second diagnosis tool 4 provides data communication via the communication line 5 in accordance with a specified communication protocol. The second diagnosis tool 4 can comply with a general-purpose communication standard called, e.g., the Ethernet (registered trademark). Therefore, the second diagnosis tool 4 can be called a general-purpose tool having a general-purpose interface compliant with a general-purpose communication standard.

The diagnosis tools 3 and 4 transmit the request signal RQ for requesting the diagnosis data from one of the control units 11 to 14 to the in-vehicle control system 2. The diagnosis tools 3 and 4 also transmit the request signal RQ to the in-vehicle control system 2 when specified diagnosis data which is among a plurality of types of diagnosis data is requested. The diagnosis tools 3 and 4 receive diagnosis data DATA from the in-vehicle control system 2. The diagnosis tools 3 and 4 also receive a deferment signal DF showing that a response to the request signal RQ is deferred.

The in-vehicle control system 2 includes a plurality of in-vehicle control units (ECUs) 11 to 15. The plurality of control units 11 to 15 are provided by electronic control units. The electronic control units are provided by a microcomputer including a computer readable storage medium. The storage medium non-temporarily stores a computer readable program. The storage medium may be provided by a semiconductor memory or a magnetic disc. The program is executed by the electronic control units to cause the electronic control units to function as the device described in this specification and cause the electronic control units to implement the control method described in this specification. The means provided by the electronic control units can also be called a functional block for achieving a given function or a module.

The plurality of control units 11 to 15 are directly or indirectly connected by an internal communication line 16 mounted in the vehicle to be capable of communicating data therebetween. The communication line 16 is provided by a vehicle network such as the CAN or LIN. The control units 11, 13, 14, and 15 are directly connected to the communication line 16. The control unit 12 is indirectly connected to the communication line 16 via the control unit 11. The in-vehicle control system 2 can include the plurality of control units the number of which is larger than that of the control units shown in the drawing.

On receiving the request signal RQ, the control units 11 to 14 perform a predetermined diagnosis process. In one of the diagnosis processes provided by the control units 11 to 14, response data including the diagnosis data is transmitted in response to the request signal RQ. When the request signal RQ requests specified diagnosis data, the control units 11 to 14 return response data including the specified diagnosis data.

The control unit (ECU1) 11 and the control unit (ECU2) 12 provide a power source control system for controlling the power source of the vehicle. For example, the control unit 11 is an engine control unit for controlling an engine. The control unit 12 is a dependent control unit for controlling equipment associated with the engine. The control unit (ECU3) 13 is a control unit for controlling the body equipment of the vehicle such as, e.g., a door lock device, a lighting device, or a meter device. The control unit (ECUn) 14 is a control unit for controlling, e.g., the air conditioning device of the vehicle.

The control unit (ECU4) 15 is configured to be able to communicate with the other control units 11 to 14 via the communication line 16. The control unit 15 is also configured to be able to communicate with the diagnosis tools 3 and 4. The control unit 15 is provided in the in-vehicle control system 2 to provide a data output device for vehicle for outputting data to the outside of the in-vehicle control system 2.

The control unit 15 is compliant with a plurality of communication standards and provides data communication between the plurality of communication standards. The control unit 15 provides a gateway function of providing data exchange between the plurality of communication standards. The control unit 15 is also called a gateway control unit (GW-ECU) or a control unit for external connection. For example, the control unit 15 provides communication compliant with the CAN between itself and the diagnosis tool 3. The control unit 15 provides communication compliant with the CAN between itself and the communication line 16. The control unit 15 also provides communication compliant with the Ethernet (registered trademark) between itself and the diagnosis tool 4, i.e., the communication line 5.

The control unit 15 includes a data relay section (DATA-TRF) 21 providing the gateway function. The data relay section 21 provides communication between different types of communication standards between the diagnosis tools 3 and 4 and the communication line 16. The data relay section 21 has the gateway function of relaying data between the diagnosis tools 3 and 4 and the control units 11 to 14 which are compliant with mutually different communication standards. In the configuration, even when the communication standards of the diagnosis tools 3 and 4 are different from the communication standards of the control units 11 to 14, data communication is provided therebetween using the gateway function of the data relay section 21. This allows the control unit 15 having the gateway function to achieve higher-speed transmission of data related to diagnosis.

The control unit 15 includes a cache management section (CASH-MNG) 22 and a cache memory section (CASH-MRD) 23. The cache management section 22 includes a cache save section (CASH-IN) 24 and a cache read section (CASH-OUT) 25.

The cache save section 24 monitors the data received by the data relay section 21 from the control units 11 to 14 via the communication line 16. The cache save section 24 also selects only a specified data item from among the plurality of data items received by the data relay section 21 and writes the specified data item in the cache memory section 23 to save the specified data item.

The cache read section 25 monitors the data received by the data relay section 21 from the diagnosis tools 3 and 4. The cache save section 24 determines whether or not the specified diagnosis data item requested based on the data received by the data relay section 21 is stored in the cache memory section 23. The cache read section 25 reads the specified data item requested from the diagnosis tools 3 and 4 and saved in the cache memory section 23 from the cache memory section 23. The cache read section 25 transmits the read specified data item to the diagnosis tools 3 and 4 through the data relay section 21.

The specified data item saved in the cache memory section 23 can include only fixed and large-capacity specified diagnosis data which is among the plurality of types of diagnosis data. That is, the control units 11 to 14 are configured to output the plurality of types of diagnosis data including the specified diagnosis data. However, the cache save section 24 saves only the specified diagnosis data in the cache memory section 23. Accordingly, the capacity of the cache memory section 23 is reduced. The specified diagnosis data is data not required to change with the lapse of time. A typical example of the specified diagnosis data is history data recorded at a specified time point. Since only the fixed data is saved in the cache memory section 23, the data saved in the cache memory section 23 can be used even when time has elapsed.

The diagnosis tools 3 and 4 and the in-vehicle control system 2 compose one data communication system. In the data communication system, the diagnosis data obtained in the terminal control units 11 to 14 is transmitted to the diagnosis tools. In the data communication system, when viewed from the diagnosis tools 3 and 4, the cache management section 22 and the cache memory section 23 are disposed at positions proximate to the diagnosis tools than the terminal control units 11 to 14. The cache management section 22 and the cache memory section 23 preliminarily save the diagnosis data and return the diagnosis data in response to a request. Therefore, when viewed from the diagnosis tools 3 and 4, the cache management section 22 and the cache memory section 23 can also be called proxy data providers disposed at the proximate positions.

Figure 2:
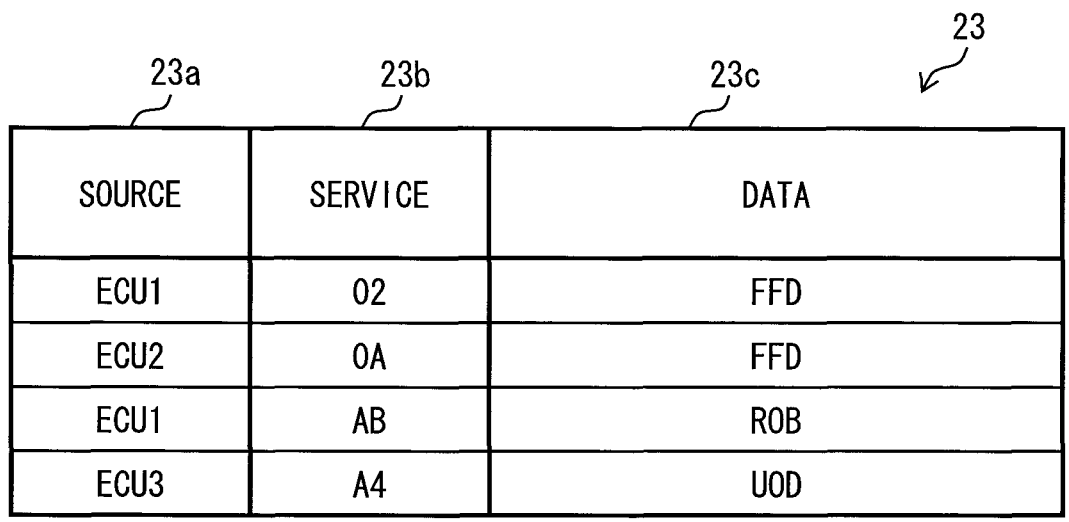
FIG. 2 is a block diagram showing a structure of a cache memory section in the first embodiment.

As shown in FIG. 2, the cache memory section 23 caches the plurality of diagnosis data items DATA. The plurality of diagnosis data items DATA can have a plurality of index information items for specifying the plurality of diagnosis data items DATA. In the example shown in the drawing, with source information 23a showing the control unit serving as the generation source of the diagnosis data and service information 23b showing the type of the diagnosis data, diagnosis data 23c is specified. For example, in the cache memory section 23, freeze frame data (FFD) having the generation source of ECU1 and the surface ID of 02 is stored. In the cache memory section 23, freeze frame data (FFD) having the generation source of ECU2 and the service ID of 0A is stored. In the cache memory section 23, ROB data (ROB) having the generation source of ECU1 and the service ID of AB is stored. In the cache memory section 23, operation factor data (UOD) having the generation source of ECU3 and the service ID of A4 is stored.

The freeze frame data is a set of data items obtained by recording the states of the vehicle when abnormalities were detected in the control units. The freeze frame data includes information showing the dates and times when the abnormalities were detected, information showing the types of the abnormalities, signals showing the operating states of the corresponding control units, signals from a plurality of sensors, signals on the communication line 16, and the like.

The ROB data is a set of data items obtained by recording the states of the vehicle when events other than the abnormality were detected in the control units. The ROB data is also called record-off behavior and includes data recorded when the vehicle showed predetermined behavior. For example, the ROB data includes information showing the dates and times when the events were detected, information showing the types of the events, signals showing the operating states of the corresponding control units, signals from the plurality of sensors, signals on the communication line 16, and the like.

The operation factor data is a set of data items obtained by recording the states of the vehicle when specified operations by the user of the vehicle were detected. The operation factor data includes information showing the dates and times when the events were detected, information showing the types of the events, signals showing the operating states of the corresponding control units, signals from the plurality of sensors, signals on the communication line 16, and the like.

The freeze frame data, the ROB data, and the operation factor data are the diagnosis data items. The freeze frame data, the ROB data, and the operation factor data are also the specified diagnosis data items among the diagnosis data items which serve as caching targets. These specified diagnosis data items have relatively large data capacities among data items communicated via the communication line 16. Accordingly, each of the specified data items is transmitted from the corresponding control unit via the communication line 16, and therefore takes a relatively long given time. Each of the specified diagnosis data items is a fixed data item and is not changed. However, a plurality of specified diagnosis data items may be generated correspondingly to the number of factors for which they are recorded.

FIG. 3 shows a transmission/reception process 140 executed by the control unit 15. The transmission/reception process 140 includes a relay process providing the data relay section 21, a save process providing the cache save section 24, and a read process providing the cache read section 25.

In Step 141, the control unit 15 receives the request RQ from the diagnosis tools 3 and 4. In Step 142, the control unit 15 determines whether or not the request RQ requests the specified diagnosis data serving as a cache process target. When the data requested by the request RQ is not the caching target, the transmission/reception process 140 advances to Step 143.

In Step 143, the control unit 15 transfers the request RQ to the targeted control unit, i.e., the control unit which is the generation source of the data. For example, when the request RQ requests the data from the control unit 11, the control unit 15 transfers the request RQ to the control unit 11 via the communication line 16. For example, when the request RQ requests the data from the control unit 12, the control unit 15 transfers the request RQ to the control unit 11 via the communication line 16. The control unit 11 further transfers the request RQ to the control unit 12. In Step 143, the control unit 15 provides data exchange between different communication standards. For example, the control unit 15 converts the request RQ from the diagnosis tool 4 compliant with the Ethernet (registered trademark) to the request RQ compliant with the CAN and transmits the converted request RQ to the communication line 16.

In Step 144, the control unit 15 determines whether or not response data responding to the request RQ is received. When the response data is returned from the targeted control unit, the transmission/reception process 140 advances to Step 145. When the response data is not returned from the targeted control unit, the transmission/reception process 140 advances of Step 148.

In Step 145, the control unit 15 determines whether or not the received response data is the caching target, i.e., whether or not the received response data is the specified diagnosis data. When the response data is not the caching target, the transmission/reception process 140 advances to Step 146. When the response data is the caching target, the transmission/reception process 140 advances to Step 147.

In Step 146, the control unit 15 transmits the received response data to the diagnosis tools 3 and 4. In Step 146, the control unit 15 provides data exchange between different communication standards. For example, the control unit 15 converts the response data compliant with the CAN to the response data compliant with the Ethernet (registered trademark) and transmits the converted response data to the communication line 5.

There are cases where the transmission/reception process 140 returns to Step 144 and it takes a long time before the control unit 15 receives the response data. The in-vehicle control system 2 includes the plurality of control units 11 to 14. In addition, communication paths and communication priorities in the in-vehicle control system 2 are complicated. For example, the control unit 11 can return the response data only through the communication line 16. However, the control unit 12 returns the response data through the control unit 11 and further through the communication line 16. Accordingly, it may take a long time before the control unit 15 receives the response data. Moreover, the specified diagnosis data is relatively-large-capacity data. Accordingly, it may take a long time to transmit the specified diagnosis data through the communication line 16. When the response data is the specified diagnosis data, it takes a long time before the control unit 15 receives the response data.

Steps 148 and 149 provide a maintenance process in which, when it takes a long time before the response data is received, a deferment notification response showing the deferment of data communication to the diagnosis tools 3 and 4 is transmitted. In Step 148, the control unit 15 determines whether or not the duration of Step 144 exceeds a given specified time Step 144 is repeated till the specified time is exceeded. When the specified time is exceeded, the transmission/reception process 140 advances to Step 149. In Step 149, the control unit 15 transmits the deferment notification response DF to the diagnosis tools 3 and 4.

Steps 148 and 149 provide a deferment notification response section for transmitting the deferment notification response DF to the diagnosis tools 3 and 4 when the time taken by the response to the request from the diagnosis tools 3 and 4 exceeds the specified time. As a result, even when the response takes a long time, it is possible to provide the deferment notification response from the control unit 15 as the data output device without depending on the other control units 11 to 14.

The process through Steps 141, 142, 143, 145, and 146 provides the relay process for the diagnosis data which is not the caching target. The relay process is for the diagnosis data other than the specified diagnosis data.

When the transmission/reception process 140 returns to Step 142 and finds that the data requested by the request RQ is the caching target, the transmission/reception process 140 advances to Step 150. In Step 150, the control unit 15 determines whether or not the specified diagnosis data shown by the request RQ has been already cached, i.e., whether or not the specified diagnosis data shown by the request RQ has been stored in the cache memory section 23. When the data requested by the request RQ is the caching target and the data has not been cached yet, the transmission/reception process 140 advances to Step 143. Thereafter, Steps 143 to 145 described above are executed. When the transmission/reception process 140 returns from Step 142 to Step 143 through Step 150, the response data is the caching target. The process branches from Step 145 to Step 147.

In Step 147, the control unit 15 saves the received response data in the cache memory section 23. In other words, in Step 147, the control unit 15 saves the received response data and thereby executes the cache process. Thereafter, the transmission/reception process 140 advances to Step 146 where the received response data is transmitted to the diagnosis tools 3 and 4.

The process through Steps 141, 142, 150, 143, 145, 147, and 146 provides the relay process and the save process when one specified diagnosis data is first relayed. Steps 145 and 147 provide the cache save section 24. In Steps 145 and 147, the specified diagnosis data transmitted from the control units 11 to 14 in response to the request from the diagnosis tools 3 and 4 is received and saved in the cache memory section 23. Thus, the specified diagnosis data item is collected using the request from the diagnosis tools 3 and 4.

When the transmission/reception process 140 returns to Step 150 and finds that the data requested by the request RQ is the caching target and the data has already been cached, the transmission/reception process 140 advances to Step 151. In Step 151, the control unit 15 reads the specified diagnosis data requested by the request RQ from the cache memory section 23 and saved. Thereafter, the transmission/reception process 140 advances to Step 146 where the read data is transmitted to the diagnosis tools 3 and 4. That is, using the specified diagnosis data subjected to the cache process, the specified diagnosis data is transmitted to the diagnosis tools 3 and 4. In this case, the control unit 5 responds to the request from the diagnosis tools 3 and 4 based on the specified diagnosis data preliminarily saved without executing the relay process. In other words, the control unit 15 responds to the request from the diagnosis tools 3 and 4 without transferring the request RQ to the control units 11 to 14 as the generation sources of the specified diagnosis data. That is, the control unit 15 responds to the request from the diagnosis tools 3 and 4 without accessing the control units 11 to 14 as the generation sources.

The process through Steps 141, 142, 150, 151, and 146 provides a read process and a response process when the saved specified diagnosis data is requested.

FIG. 4 shows a response process 160 executed by each of the control units 11 to 14. In Step 161, the control units 11 to 14 receive the request RQ relayed by the control unit 15. In Step 162, the control units 11 to 15 transmit the response data to the control unit 15. The response data transmitted here is the diagnosis data.

FIG. 5 shows an update process 170 executed by the control unit 15. The update process 170 includes an erase process for erasing the specified diagnosis data saved in the cache memory section 23. The update process 170 also includes a recovery process for restoring data in the control unit as the generation source based on the specified diagnosis data saved in the cache memory section 23.

In Step 171, the control unit 15 inputs various signals. The signals input here include command signals input from the in-vehicle control system 2 or the diagnosis tools 3 and 4, and state signals showing the states of the plurality of control units 11 to 14. The command signals include a command signal for requesting erasing of the data saved in the cache memory section 23. The state signals include a signal showing an initialization process in the control units 11 to 14 and a signal showing a failure in the control units 11 to 14.

In Step 172, the control unit 15 determines whether or not the input signal requests the erasing of the data from the cache memory section 23. When the erasing of the data from the cache memory section 23 is requested, the update process 170 advances to Step 173. In Step 173, the control unit 15 erases the specified diagnosis data saved in the cache memory section 23.

Step 173 after the update process 170 passes through Step 172 provides the erase section for erasing the specified diagnosis data saved in the cache memory section 23 in response to the request from the diagnosis tools 3 and 4. The configuration allows the specified diagnosis data saved in the cache memory section 23 to be erased.

In Step 172, when erasing of the data from the cache memory section 23 is not requested, the update process 170 advances to Step 174. In Step 174, the control unit 15 determines whether or not the initialization process has been executed in any of the other control units 11 to 14. For example, when a power supply to the other control units 11 to 14 is temporally cut off, the initialization process may be executed. When the other control units 11 to 14 are initialized, the data stored in these control units 11 to 14 is erased. Additionally, in Step 175, the control unit 15 determines whether or not any failure has occurred in the other control units 11 to 14 and destroyed the data stored in these control units 11 to 14. For example, due to a failure in a memory device, the data may be destroyed. When the initialization process is executed or such a failure as to destroy the data occurs in the other control units 11 to 14, the update process 170 advances to Step 176. When neither the initialization process nor failure occurs, the update process 170 is ended.

Step 173 after the update process 170 passes through Step 174 or Step 175 provides an erase section which erases the specified diagnosis data saved in the cache memory section 23 when the specified diagnosis data is lost in the control units 11 to 14. With the configuration, it is possible to avoid a mismatch between the original specified diagnosis data stored in the control units 11 to 14 and the specified diagnosis data saved in the cache memory section 23.

In Step 176, the control unit 15 determines whether or not the recovery process is requested. The recovery process is a process for restoring the specified diagnosis data to be stored in the other control units 11 to 14 based on the specified diagnosis data saved in the cache memory section 23. Whether or not the recovery process is required can be set in advance in the control unit 15. Alternatively, whether or not the recovery process is required may also be input from the diagnosis tools 3 and 4. When the recovery process is not required, the update process 170 advances to Step 173. When the recovery process is required, the update process 170 advances to Step 177.

In Step 177, the control unit 15 executes the recovery process. In the recovery process, the control unit 15 transmits the specified diagnosis data saved in the cache memory section 23 to the targeted other control units 11 to 14. The targeted other control units 11 to 14 receive the specified diagnosis data and store therein the received specified diagnosis data. Thus, based on the saved specified diagnosis data as cached data, the specified diagnosis data in the control units as the generation sources can be restored.

Step 177 provides a restoration section for, when the specified diagnosis data item is lost in the control units 11 to 14, restoring the specified diagnosis data in the control units 11 to 14 based on the specified diagnosis data saved in the cache memory section 23. With the configuration, it is possible to restore the specified diagnosis data in the control units 11 to 14 using the specified diagnosis data saved in the cache memory section 23.

According to the present embodiment, the cache management section 22 and the cache memory section 23 provide a caching function with regard to the specified data. In the caching function, the specified data is provided without an access to the generation source of the specified data. The caching function includes a stage at which the specified data is preliminarily saved. The caching function also includes the stage at which it is determined that the specified data is requested. The caching function also includes the stage at which the request is responded to based on the specified data preliminarily saved without an access to the generation source of the specified data. By providing the control unit 15 with the caching function, it is possible to provide the diagnosis data at a high speed in response to the request from the diagnosis tools 3 and 4.

In addition, the control unit 15 having the gateway function is capable of data communication with the diagnosis tool 4 compliant with a communication standard different from the communication standard of the communication line 16. Moreover, the control unit 15 can provide data communication with the diagnosis tool 3 and data communication with the diagnosis tool 4. By thus providing the control unit 15 with the caching function, it is possible to provide the diagnosis data at a high speed without increasing traffic on the communication line 16.

The diagnosis tool 4 is connected to the in-vehicle control system 2 via the general-purpose communication line 5 such as the Internet. In such a configuration, a request from the diagnosis tool 4 may be input irrespective of the operating state of the vehicle. For example, even when the vehicle is in a running state, an arithmetic operation process in the in-vehicle control system 2 places a high load, and traffic on the communication line 16 is heavy, it is expected that a request is input from the diagnosis tool 4. However, in the present embodiment, the control unit 15 proximate to the diagnosis tool 4 when viewed from the diagnosis tool 4 is provided with the caching function. Accordingly, even a configuration which allows connection to the diagnosis tool 4 having high versatility can provide the diagnosis data at a high speed, while suppressing influence on the function in the in-vehicle control system 2.

Second Embodiment

In the foregoing embodiment, when the specified diagnosis data intended to serve as the cache process target is first relayed, the cache management section 22 saves the specified diagnosis data in the cache memory section 23. That is, the cache management section 22 provides a collection section for passively collecting the specified diagnosis data. In addition to or instead of the collection section for passively collecting the specified diagnosis data in the foregoing embodiment, the cache management section 22 may also provide a collection section which positively collects the specified diagnosis data intended to serve as the cache process target.

Figure 6:
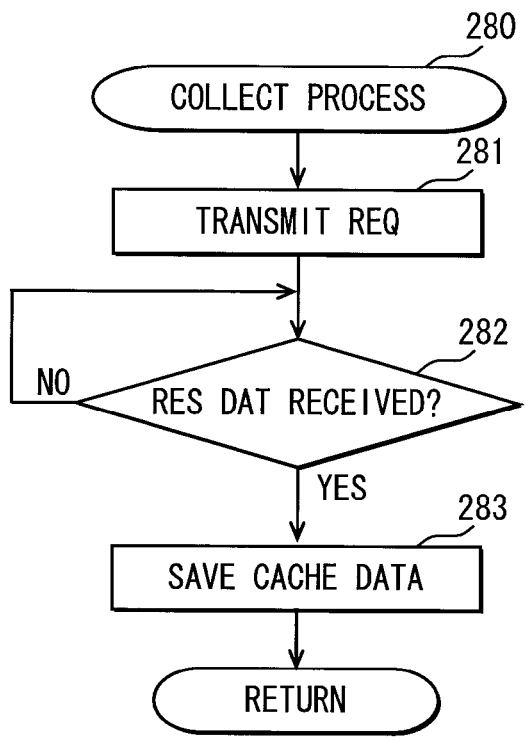
FIG. 6 is a flow chart showing a collection process in a second embodiment.

FIG. 6 shows a collection process 280 executed by the control unit 15. The collection process 280 provides the collection section.

In Step 281, the control unit 15 requests transmission of the specified diagnosis data from the other control units 11 to 14. The other control units 11 to 14 execute the response process described above to return the response data. In step 282, the control unit 15 determines whether or not the response data has been received from the other control units 11 to 14. When the response data is received, the collection process 280 advances to Step 283. In Step 283, the control unit 15 saves the received specified diagnosis data in the cache memory section 23.

The control unit 15 is configured to execute Step 281 by being triggered by a given event. For example, the control unit 15 can be configured to execute Step 281 for each operation unit of the vehicle. An operation unit is called, e.g., a trip. The operation unit can be assumed to be a period from the time when the power source of the vehicle is turned ON to the time when the power source of the vehicle is turned OFF.

The collection process 280 provides the cache save section 24. The collection process 280 requests transmission of the specified diagnosis data from the control units 11 to 14 without depending on the request from the diagnosis tools 3 and 4 and saves the received specified diagnosis data in the cache memory section 23. In the configuration, the specified diagnosis data is automatically collected.

In the configuration, the control unit 15 requests only diagnosis service in which the capacity of the response data exceeds a predetermined capacity for each operation unit of the vehicle from the other control units 11 to 14. The control unit 15 that has received the response data saves the response data in the cache memory section 23. Thereafter, when the foregoing diagnosis service is requested from the diagnosis tools 3 and 5, the control unit 15 responds to the diagnosis tools 3 and 4 based on the data saved in the cache memory section 23 without requesting the diagnosis service from the other control units 11 to 14. This achieves higher-speed transmission of the diagnosis data.

Third Embodiment

In the foregoing embodiment, the specified diagnosis data intended to serve as the cache process target is collected in response to the request from the cache management section 22. In addition to or instead of performing the collection of the specified diagnosis data as in the foregoing embodiment, the cache management section 22 may also provide a collection section based on push communication which receives and collects the specified diagnosis data forcibly transmitted from the other control units 11 to 14.

Figure 7:
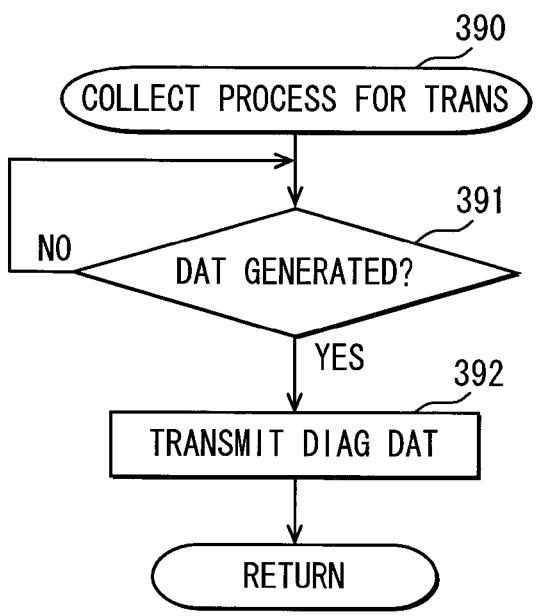
FIG. 7 is a flow chart showing a part of the collection process in a third embodiment.
Figure 8:
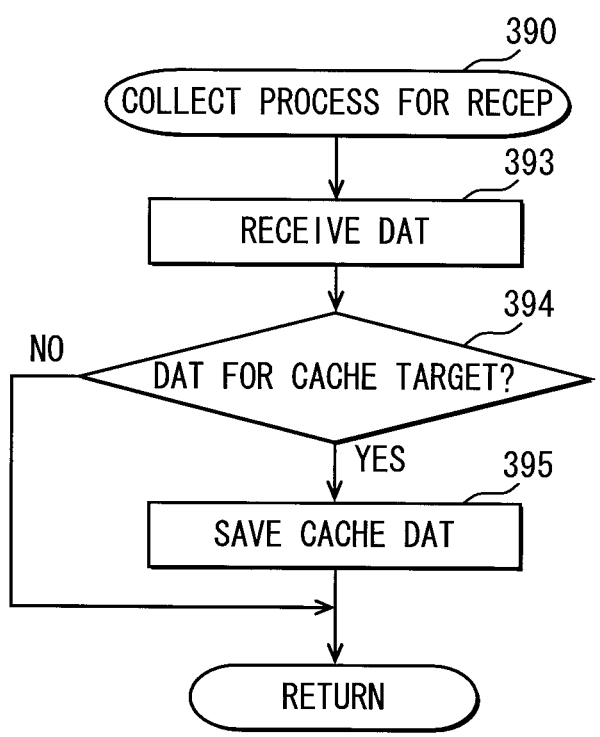
FIG. 8 is a flow chart showing another part of the collection process in the third embodiment.

FIGS. 7 and 8 show a collection process 390 executed by the control unit 15 and the other control units 11 to 14, of which FIG. 7 shows a transmission process executed by the other control units 11 to 14 and FIG. 8 shows a reception process executed by the control unit 15. The collection process 390 provides the collection section.

In Step 391, the other control units 11 to 14 determine whether or not the specified diagnosis data is generated. When the specified diagnosis data, i.e., data serving as the cache process target is generated, the collection process 390 advances to Step 392. In Step 392, the other control units 11 to 14 transmit the generated specified diagnosis data to the control unit 15.

In Step 393, the control unit 15 receives the data. In Step 394, the control unit 15 determines whether or not the received data is the cache process target. When the received data is not the cache process target, the collection process 390 is ended. When the received data is the cache process target, the collection process 390 advances to Step 395. In Step 395, the control unit 15 saves the received data item, i.e., the specified diagnosis data in the cache memory section 23.

The collection process 390 provides the cache save section 24. In the collection process 390, the specified diagnosis data transmitted from the control units 11 to 14 in response to the given event is received and saved in the cache memory section 23. In the configuration, the specified diagnosis data is automatically collected.

In the configuration, when diagnosis data having a capacity exceeding a predetermined capacity is generated, the other control units 11 to 14 forcibly transmit the diagnosis data to the control unit 15. The control unit 15 that has received the diagnosis data saves the received diagnosis data in the cache memory section 23. Thereafter, when the foregoing diagnosis service is requested from the diagnosis tools 3 and 4, the control unit 15 responds to the diagnosis tools 3 and 4 based on the data saved in the cache memory section 23 without requesting the diagnosis service from the other control units 11 to 14. This increases the speed of transmission of the diagnosis data. This achieves higher-speed transmission of the diagnosis data.

Fourth Embodiment

In the foregoing embodiment, when it takes a long time to respond with the specified diagnosis data, the deferment notification response is transmitted from the control unit 15. When the specified diagnosis data is requested from the diagnosis tools 3 and 4, instead of or in addition to transmitting the deferment notification request after the lapse of a long time, a deferment notification response may also be transmitted to the diagnosis tools 3 and 4 before a long time elapses.

In FIG. 9, a transmission/reception process 440 has Step 452 between Steps 150 and 143. In Step 452, the control unit 15 transmits a deferment notification response to the diagnosis tools 3 and 4. Step 452 is provided after the transmission/reception process 440 is branched from Step 142 to YES. Therefore, Step 452 is performed when the specified diagnosis data is requested from the diagnosis tools 3 and 4. In addition, Step 452 is provided before Step 143. As a result, in Step 452, the control unit 15 transfers the request signal RQ to the other control units 11 to 15 and the deferment notification response is transmitted before the specified diagnosis data is requested. Step 452 provides a deferment pre-notification response section.

In the configuration, when specified diagnosis data is requested and a response thereto is highly likely to take a long time, it is possible to notify the diagnosis tools of the deferment of the response before a long time elapses.

Other Embodiments

While the predetermined embodiments of the present disclosure have been described heretofore, the present disclosure is by no means limited to the embodiments described above, but can be variously modified and carried out. The structures of the foregoing embodiments are only illustrative, and the technical scope of the present disclosure is not limited by the scope of the description therein. The technical scope of the present disclosure is shown by the description and is intended to include the meanings equivalent to the description and all the modifications.

For example, the means and function provided by each of the control units can be provided by only software, only hardware, or a combination thereof. For example, the control unit can also be composed of an analog circuit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data output device for a vehicle that performs data communication with a diagnosis tool disposed on an outside of the vehicle and performs data communication with an in-vehicle control unit, which outputs specific diagnosis data in response to a request from the diagnosis tool, the data output device comprising:
   a cache memory section for storing the specific diagnosis data;
   a cache save section for controlling the cache memory section to store the specific diagnosis data output from the control unit;
   a cache read section for reading the specific diagnosis data in the cache memory section and responding to the diagnosis tool based on the specific diagnosis data when the request from the diagnosis tool requests the specific diagnosis data; and
   an erase section for erasing the specific diagnosis data in the cache memory section when the specific diagnosis data in the control unit is lost.

2. The data output device according to claim 1, wherein:
   the control unit outputs a plurality of types of diagnosis data including the specific diagnosis data; and
   the cache save section controls the cache memory section to store only the specific diagnosis data.

3. The data output device according to claim 2, wherein:
   the specific diagnosis data is fixed data.

4. The data output device according to claim 1, further comprising:
   a data relay section having a gateway function for relaying data between the diagnosis tool and the control unit, wherein:
   a communication standard of the diagnosis tool is different from a communication standard of the control unit.

5. The data output device according to claim 1, wherein:
   the erase section is configured to erase the specific diagnosis data in the cache memory section in response to the request from the diagnosis tool.

6. A data output device for a vehicle that preforms data communication with a diagnosis tool disposed on an outside of the vehicle and performs data communication with an in-vehicle control unit, which outputs specific diagnosis data in response to a request from the diagnosis tool, the data output device comprising:
   a cache memory section for storing the specific diagnosis data;
   a cache save section for controlling the cache memory section to store the specific diagnosis data output from the control unit;
   a cache read section for reading the specific diagnosis data in the cache memory section and responding to the diagnosis tool based on the specific diagnosis data when the request from the diagnosis tool requests the specific diagnosis data; and
   a restoration section for restoring the specific diagnosis data in the control unit based on the specific diagnosis data in the cache memory section when the specific diagnosis data in the control unit is lost.

7. The data output device according to claim 1, wherein:
   the cache save section receives the specific diagnosis data, which is transmitted from the control unit, in response to a predetermined event, and controls the cache memory section to store the specific diagnosis data.

8. The data output device according to claim 1, wherein:
   the cache save section receives the specific diagnosis data transmitted from the control unit in response to the request from the diagnosis tool, and controls the cache memory section to store the specific diagnosis data.

9. The data output device according to claim 8, further comprising:
   a deferment pre-notification response section for transmitting a response deferment notification to the diagnosis tool before the data output device requests the specific diagnosis data to the control unit when the diagnosis tool requests the specific diagnosis data.

10. The data output device according to claim 1, further comprising:
    a deferment notification response section for transmitting a response deferment notification to the diagnosis tool when a response time of the request from the diagnosis tool exceeds a predetermined time.

11. The data output device according to claim 1, wherein:
    the cache save section requests the control unit to transmit the specific diagnosis data without depending on the request from the diagnosis tool, and controls the cache memory section to store the specific diagnosis data.

* * * * *